United States Patent Office 3,591,523
Patented July 6, 1971

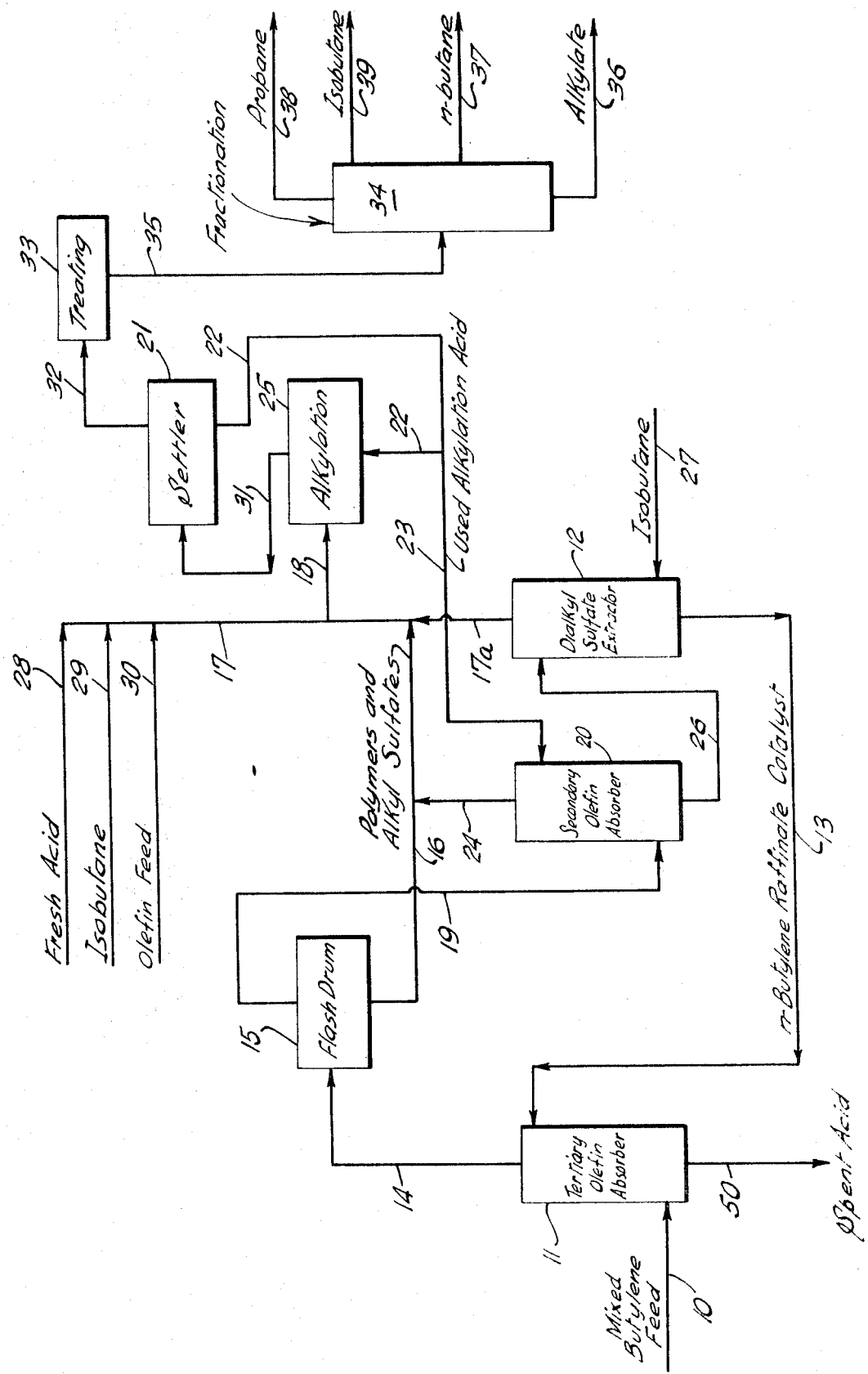

3,591,523
CATALYST AND PROCESS FOR MAKING TERTIARY OLEFIN FEED STOCKS SUITABLE FOR SULFURIC ACID RECOVERY PROCESS
Arthur R. Goldsby, Chappaqua, N.Y., assignor to Texaco Inc., New York, N.Y.
Filed June 27, 1968, Ser. No. 740,761
Int. Cl. C07c 3/54, 11/00
U.S. Cl. 252—426
5 Claims

ABSTRACT OF THE DISCLOSURE

Methods of preparing olefin conversion catalysts in connection with alkylation operations by reacting a secondary olefin with strong sulfuric acid until no further reaction occurs and concurrently extracting dialkyl sulfates formed therefrom with a hydrocarbon solvent. Catalysts are useful for selectively polymerizing tertiary olefin in the presence of other olefins and to form alkyl sulfates from tertiary olefins. Catalysts prepared from propylene are also effective for conversion of n-butylenes. Catalysts are particularly useful for removal of tertiary olefins from olefin feed stocks charged to absorption section of sulfuric acid recovery process operated in conjunction with an alkylation system. In such operation polymers of tertiary olefins are removed from treated olefin feed and the remaining secondary olefins are absorbed in used sulfuric acid alkylation catalyst. Absorbed secondary olefins are extracted as alkyl sulfates with isobutane and passed to alkylation.

CROSS-REFERENCE TO RELATED APPLICATIONS

This invention is related to a process disclosed in my U.S. Letters Pat. 3,502,742, issued Mar. 24, 1970 which is concerned with removing tertiary olefins from an olefin feed stock to make it satisfactory for use in sulfuric acid recovery in the alkylation of an olefin with isobutane.

BACKGROUND OF THE INVENTION

Field of the invention

This invention is directed to improvements in the utilization of sulfuric acid employed in the alkylation of olefins or aromatics in the presence of sulfuric acid catalyst. More particularly, it is concerned with new olefin conversion catalysts and with a method of restoring the catalytic effectiveness of sulfuric acid catalyst by the absorption of olefins therein, separating the alkyl sulfates thus formed from the alkylation contaminants, and alkylating the alkyl sulfates with release of 100 percent $H_2SO_4$. Tertiary olefins, such as isobutylene, may be removed from an olefin feed stock to an alkylation unit by contacting the olefin feed stock with the new catalyst to cause polymerization of the tertiary olefin, and the resulting polymer is removed prior to contact with sulfuric acid alkylation catalyst.

When strong sulfuric acid such as fresh make-up alkylation acid or used alkylation acid catalyst having a titratable acidity of about 85–90% and containing only about 2–4 percent of water is used for the absorption of certain olefins, such as stocks containing isobutylene, under conditions used for propylene and n-butylene absorption, a substantial portion of the tertiary olefin undergoes adverse irreversible side reactions which result in loss of both tertiary olefin and acid. This has meant that as a practical matter propylene which is substantially free of butylenes or butylenes which are substantially free of isobutylene have been required for best results in the acid recovery process.

SUMMARY OF THE INVENTION

This invention relates to methods of preparing and using novel olefin conversion catalysts made by reacting a secondary olefin, such as propylene, with strong sulfuric acid and until no further reaction occurs and concurrently removing resulting dialkyl sulfates by extraction with a hydrocarbon solvent. By employing the catalyst of this invention, feedstocks containing tertiary olefins, such as isobutylene, may be handled with excellent results in a sulfuric acid alkylation process operated in conjunction with a sulfuric acid recovery process. In processing such feedstocks the tertiary olefin is removed by contacting with such catalyst, removing the absorbed tertiary olefin in the form of polymers from the catalyst by extraction with isobutane, absorbing the remaining secondary olefins in used alkylation acid, extracting the dialkyl sulfate therefrom with isobutane, which also results in the elimination of alkylation contaminants, and alkylating the recovered tertiary olefin polymers and dialkyl sulfates with isobutane. Not only is the tertiary olefin recovered as polymer and all or most is alkylated, but by removal of the t-olefins from the secondary olefin the secondary olefins may be used as the charge stock to the acid recovery absorber.

One advantage of my invention is that it makes it possible to use olefin feedstocks containing isobutylene and tertiary amylene for the recovery of used alkylation acid, and thus extends greatly the applicability of the sulfuric acid recovery process. A further advantage of this process is the achievement of higher conversion of sulfuric acid alkylation catalyst to dialkyl sulfates with resultant higher recovery of sulfuric acid catalyst upon alkylation of the dialkyl sulfates. Propylene stocks free of butylenes and facilities for separating butylenes from propylene are not required. Other advantages are that a higher yield of alkylate basis the olefin feed and a lower net acid consumption are obtained from the same charge stocks. By this process isobutylene and tertiary amylenes are not only economically removed and recovered from stocks containing them, but they are economically utilized by alkylating their polymers. Any polymers and alkyl sulfates formed during the absorption and recovery of the tertiary olefins can be utilized by extracting or removing them with a hydrocarbon solvent, such as isobutane, and charging them to alkylation.

A tertiary olefin is one in which one of the olefinic carbon atoms has no hydrogen atom on it, and the olefinic carbon atom with no hydrogen atoms on it is attached to three other carbon atoms. The tertiary olefins of most interest in connection with this invention are isobutylene and the tertiary amylenes. Higher tertiary olefins which can be removed or absorbed selectively by weak sulfuric acid of about 60–70% concentration are also of interest.

There is one tertiary butylene and there are two tertiary amylenes, as follows:

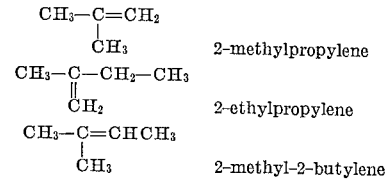

| | |
|---|---|
| $CH_3-C=CH_2$ | |
| $\quad\vert$ | |
| $\quad CH_3$ | 2-methylpropylene |
| $CH_3-C-CH_2-CH_3$ | |
| $\quad\vert\vert$ | |
| $\quad CH_2$ | 2-ethylpropylene |
| $CH_3-C=CHCH_3$ | |
| $\quad\vert$ | |
| $\quad CH_3$ | 2-methyl-2-butylene |

A secondary olefin is one in which at least one of the olefinic carbon atoms has one hydrogen on it, and at least one of the olefinic carbon atoms is attached to two other carbon atoms. There is one secondary propylene, and there are two secondary butylenes (three if cis and trans 2-butylene are considered as separate compounds), and three secondary amylenes, as follows:

| | |
|---|---|
| $CH_3-CH=CH_2$ | propylene |
| $CH_2=CH-CH_2-CH_3$ | 1-butylene |
| $CH_3-CH=CH-CH_3$ | 2-butylene |
| $CH_2=CH-CH_2-CH_2-CH_3$ | 1-pentene |
| $CH_3-CH=CH-CH_2-CH_3$ | 2-pentene |
| $CH_3-\underset{CH_3}{\underset{\|}{C}}=CH-CH_3$ | 2-methyl-2-butylene |

From the experiments and examples which will be described later it has been found that:

(1) A catalyst effective for the conversion of tertiary olefins and n-butylenes can be made by reacting to completion strong sulfuric acid, such as 98.0–99.5% sulfuric acid or used sulfuric acid alkylation catalyst with propylene, hereinafter called propylene raffinate conversion catalyst.

(2) A catalyst effective for the conversion of tertiary olefins can be made by reacting to completion strong sulfuric acids, such as 98.0–99.5% sulfuric acid or used sulfuric acid alkylation catalyst with n-butylene, hereinafter called n-butylene raffinate conversion catalyst.

(3) A catalyst effective for the conversion of tertiary olefins can be made by reacting to completion strong sulfuric acid, such as 98.0–99.5% sulfuric acid or used sulfuric acid alkylation with propylene and then further reacting the catalyst to completion with n-butylene, hereinafter called mixed propylene-n-butylene raffinate conversion catalyst. The same or equivalent catalyst can be made by reacting strong sulfuric acid to completion with a mixture of propylene and n-butylene.

BRIEF DESCRIPTION OF THE DRAWINGS

Having set forth its general nature, the invention will be best understood from the more detailed description hereinafter which refers to the accompanying drawing. Although the drawing illustrates one arrangement of apparatus in which the process of this invention may be practiced, it is not intended to limit the invention to the particular apparatus or materials described.

DESCRIPTION OF A PREFERRED EMBODIMENT

Referring to the drawing, a mixed butylene feed containing isobutylene is passed through line 10 to countercurrent teritary olefin absorber 11 near the bottom of the tower, absorber 11 being operated in the liquid phase at 60 pounds per square inch gauge. n-Butylene raffinate conversion catalyst from extractor 12 is charged through line 13 to tertiary olefin absorber 11 near the top of the tower, the tower being operated with a top temperature of about 50° F. The butylenes rise in the tower and the isobutylene reacts with the descending conversion catalyst. Absorber 11 should be operated so that all of the isobutylene reacts.

Although not shown, if desired, the spent acid in line 50 from absorber 11 can be extracted with isobutane to extract alkyl sulfates and the extract passed to alkylation.

The product from absorber 11 comprising n-butylenes, alkyl sulfates and polymers of isobutylene are sent through line 14 to flash drum 15 which is operated to remove all or most of the n-butylenes. The remaining liquid comprising principally alkyl sulfates and polymers is passed through lines 16, 17 and 18 to alkylation. The gaseous ovehead from flash drum 15 comprising n-butylenes is compressed and cooled by means not shown and passed through line 19 to secondary olefin or n-butylene absorber 20. Used sulfuric acid alkylation catalyst of about 90% $H_2SO_4$ concentration from alkylation settler 21 is also charged to absorber 20 through lines 22 and 23.

Although tertiary olefin absorber 11 is described as being operated in the liquid phase, it can be operated in the vapor phase. In this case, the gaseous overhead comprising n-butane and n-butylenes is compressed and cooled and passed to secondary olefin absorber 20. Liquid polymer containing dissolved alkyl sulfates can be passed to alkylation.

If desired, the liquid polymers can be fractionated and only the dimer alkylated, or a suitable fraction can be used in motor fuel blends. Secondary olefin absorber 20 is operated in the liquid phase at about 60 p.s.i.g., and a temperature of 20–40° F. is maintained. Absorber overhead liquid containing some dissolved alkyl sulfates and any unreacted olefin is withdrawn through line 24 and passed by lines 16, 17 and 18 to alkylation zone 25. The absorption reaction mixture acid phase comprising dialkyl sulfate is passed through line 26 to countercurrent dialkyl sulfate extractor 12 near the top. Isobutane from line 27 is passed to extractor 12 near the bottom. The extractor overhead effluent comprising isobutane and dialkyl sulfates substantially free of alkylation contaminants is passed through lines 17a and 18 to alkylation reactor 25. n-Butylene raffinate conversion catalyst or spent acid is discharged through line 13 from the bottom of extractor 12 and passed to tertiary olefin absorber 11 near the top thereof. This catalyst comprises alkylation contaminants, such as acid-oil complex and water, any unextracted alkyl sulfates, and free sulfuric acid.

Advantageously, two absorbers and two extractors may be used with the raffinate acid from the first extractor being used as charge acid to the second absorber. In the first absorber the concentration of the make-up acid to the absorber and the amount of olefin absorbed may be controlled so that the organic contaminant which is harmful to alkylation is not extracted in the extraction step.

The tertiary olefin or isobutylene polymers and dissolved alkyl sulfates comprising the bottoms withdrawn from flash drum 15 through line 16, the n-butylenes absorbed in absorber 20 from line 24, additional isobutane from line 29, and olefin feed from line 30 are alkylated in alkylation reactor 25 with a sulfuric acid catalyst. Fresh sulfuric acid of 98.0–99.5% concentration through lines 28, 17 and 18 and recycle acid of about 90% concentration in line 22 are also charged to reactor 25. The alkylation reaction mixture is passed through line 31 to alkylation settler 21. Acid and hydrocarbon phases are separated in settler 21, the acid phase being recycled to alkylation zone 25 through line 22 and the hydrocarbon effluent being withdrawn through line 32 to conventional treating section 33 and fractionation facility 34 through line 35. In facility 34, alkylate product is separated and discharged through line 36 for motor fuel or other use. n-Butane and propane are withdrawn through lines 37 and 38, respectively, and isobutane is withdrawn through line 39 for recycle to line 27 and alkylation zone 25.

In general, the same conditions are required for tertiary amylene and tertiary hexylene containing stocks as for isobutylene containing stocks. Hence, for simplicity, conditions required for isobutylene stocks will be discussed in more detail under several headings, which follow:

TERTIARY OLEFIN ABSORPTION

Any feed stock containing a tertiary olefin can be used for the reaction with or absorption in the propylene or n-butylene raffinate conversion catalyst prepared in accordance with this invention. $C_4$ fractions, $C_3$–$C_4$ fractions, and $C_5$ fractions from catalytic cracking, absorber tail gas from catalytic cracking and polymerization effluent gas are exemplary of the type of olefin feedstock which may be used.

A feature of the tertiary olefin absorption step of the process is the extraction or reaction of substantially all of the isobutylene, since any isobutylene remaining in the n-butylene will destroy an excessive amount of alkylation acid catalysts during the formation of dialkyl sulfates. Thus, conditions are selected to favor complete removal of isobutylene rather than to obtain a high degree of selectivity. However, this conversion catalyst is much more selective than sulfuric acid of about 60–70% concentration for removal of tertiary olefins. Also, the catalyst is very effective for the conversion of tertiary olefins. Conditions favoring complete isobutylene removal include the use of good mixing, good temperature control and maintenance of an effective catalyst. Any extractable alkyl sulfates and polymers formed are utilized substantially without any separate processing cost, since they may be recovered in the feed stocks passed to alkylation, although if desired only the lighter polymers and alkyl sulfates may be alkylated.

The temperature in the isobutylene absorption step is not critical, and the operable range of temperature will depend upon a number of factors, including the conditions under which the catalyst was made. In general, not much higher temperatures should be used than the temperature used in making the catalyst. A temperature of about 30–100° F. is satisfactory, and a temperature below about 100° F. is usually used, preferably in the range of 40 to 75° F.

The absorption can be carried out in the vapor phase, allowing the unreacted n-butylenes to pass out of the extraction vessel in the vapor phase. However, liquid phase absorption is satisfactory, and under some conditions more complete removal of the isobutylene may be obtained in the liquid phase, and also some extraction of the alkyl sulfates in the hydrocarbon occurs. When liquid phase conditions are used, isobutylene and any polymer or isobutyl acid sulfate dissolved in the liquid n-butylene phase are advantageously removed before charging the n-butylenes to the used alkylation acid absorber or secondary olefin absorber 20.

Since a substantial amount of heat is released during the reaction of tertiary olefins with the catalyst, it is necessary to cool the absorption step to maintain the temperaure within the desired range. Cooling of this and subsequent absorption steps is effected by cooling the feed streams to the absorption tower and/or by cooling material within the absorption step either by evaporative cooling or by indirect heat exchange methods. Liquid may be withdrawn from the absorption system, cooled by indirect heat exchange, and returned to the absorber. Coolant may be supplied by a separate refrigeration system or may be effected with a process stream. In one embodiment of this process, hydrocarbon effluent from the alkylation reaction zone is flashed effecting vaporization of a part of the hydrocarbon liquid and cooling of the resulting liquid and vapor. The resulting chilled hydrocarbon liquid and vapor are passed in direct heat exchange with a stream of the absorption reaction mixture to effect cooling thereof.

The important thing in the absorption and reaction of the tertiary olefin is to choose reaction conditions with the catalyst such that the tertiary olefin is selectively and almost completely removed, leaving the secondary olefins unabsorbed. With isobutylene containing stocks this appears to be quite easy, as the catalyst is quite selective and quite active. Thus a simple agitated reactor is usually adequate, but if desired, a countercurrent tower, or a more efficient absorption system, such as disclosed in my copending application, Ser. No. 692,623, filed Dec. 1, 1967 could be used.

SECONDARY OLEFIN ABSORBER

The feed to the secondary olefin absorber is the hydrocarbon effluent from the tertiary olefin absorber, comprising secondary olefins alone or with propylene and any additional $C_3$, $C_4$, $C_5$ or higher hydrocarbons. The secondary olefin absorber feed may be supplemented with other olefin streams which are substantially free of tertiary olefin. The secondary olefins in the $C_3$ to $C_5$ range are of most interest. For simplicity, an all butylene feed stock is described in connection with the drawing. However, if a mixed $C_3$–$C_4$ olefin feed is used for the sceondary olefin absorber, and one starts with a propylene raffinate conversion catalyst, in time the spent acid or catalyst will take on some of the characteristics of the n-butylene raffinate conversion catalyst. There are various possibilities if more than one secondary olefin absorber is used. For example, an all propylene raffinate catalyst can be made and used in the tertiary olefin absorber by charging only propylene to one of the secondary olefin absorbers with used sulfuric acid catalyst. An all n-butylene raffinate catalyst can be made by charging only n-butylene to the secondary olefin absorber. A mixed propylene-n-butylene raffinate conversion catalyst can be made by charging a mixed propylene-n-butylene feed to the secondary olefin absorber.

For best results it is essential that the secondary olefin absorption system be carried out so that the catalyst or spent acid produced will not react with any more propylene. This is true whether propylene, mixed propylene-n-butylene, or n-butylene feed is used. Otherwise, the catalyst will still be too active and will destroy tertiary olefins. It is not essential that the catalyst not be capable of reacting with n-butylene since a propylene catalyst will react with n-butylenes and still be a satisfactory catalyst for isobutylene. In general it is necessary to extract most of the dialkyl sulfate formed, or otherwise the catalyst after removal of some of the dialkyl sulfate will be capable of reacting with more secondary olefin and will be too active for tertiary olefins. However, a modest amount of dialkyl sulfate, say up to about 10 to 15% in the catalyst, seems to be satisfactory. In fact it is difficult to remove all of the dialkyl sulfate. A catalyst which has been thus prepared may be described as having been reacted to completion.

To insure a high conversion of the used alkylation acid, and to insure that catalyst is satisfactory for tertiary olefins and will not react with more propylene, procedures such as described in my copending application Ser. No. 704,934, filed Feb. 12, 1968, are advantageous.

The secondary olefin absorption can be carried out in either vapor or liquid phase, or in a combination of the two. For example, part of the absorption may be carried out in the vapor phase, followed by liquid phase for the final portion of the absorption step for a high conversion of the acid to dialkyl sulfates. Cooling in the absorption step may be effected if desired, by introducing all or a part of the charge, or extraneous hydrocarbons, such as propane, in liquid phase and allowing it to vaporize by the heat of reaction in the absorber. Cooling may also be effected by using charge streams to the absorber cooled to a temperature below the absorber reaction temperature, for example, the used acid catalyst may be supplied from an emulsion flashing alkylation operation. Cooling may also be obtained by indirect heat exchange with cooling coils either in the absorber or outside.

Used sulfuric acid alkylation catalyst having a titratable acidity of 88 to 93% by weight and containing only about 2 to 4 percent water is the preferred acid charge stock for the secondary olefin absorption step, although in some cases, for example, if amylenes are being alkylated, it may have a concentration as low as 80 to 85%: Acid from other sources, such as fresh acid, acid from chemical reactions, and acid from the acid treatment of petroleum naphtha or lube oil also can be used. Acid with a concentration as low as about 78 percent $H_2SO_4$ and containing up to 22 percent water may be used for the absorption of propylene and n-butylenes, and can be used to make the desired catalysts.

Stocks such as absorber tail gas or polymerization effluent gas usually contain substantial amounts of ethylene, as well as inerts. It is well known that ethylene is harmful to alkylation in that it causes an increase in the acid consumption. An effective means of handling ethylene containing olefin feed stocks is to run the absorber under conditions such that the ethylene will not react with the acid and, thus, it will be eliminated along with the inerts and not charged to alkylation. Such conditions include, for example, use of vaopr phase absorption, a short residence time, low temperatures, low partial pressure of ethylene, acid diluted with alkyl sulfates, and lower concentration acids. The small amount of ethylene reacted to form ethyl acid sulfate or diethylsulfate is eliminated from the system in the raffinate or spent acid from the extractor after strong acid absorption of the n-butylene.

A short residence time and low temperature are conductive to good results in the absorber and are preferred although other factors have a considerable bearing on the operation. The efficiency of contacting of olefin with acid is of course very important. Residence times as short as a few seconds or minutes may be used if the feed stock is passed through an efficient contacting device. On the other hand, a residence time as long as an hour or longer may be used in a liquid phase reactor, or in a packed countercurrent tower by venting inerts in vapor phase and recycling liquid reaction mixture from near the bottom of the tower to about hlaf way up or higher in the tower.

A temperature range of 30 to 50° F. is satisfactory for propylene although less conjunct polymer is formed at lower temperatures. For n-butylene-containing stocks, a temperature of 20 to 40° F. is preferred.

The isobutylene and also the n-butylene absorption steps may be effected in contacting equipment well known in the art, for example, mixer settlers, centrifugal contactors, countercurrent towers or two or more mechanically stirred reactors operating to give countercurrent flow. When it is desired to obtain a high conversion of the acid to dialkyl sulfates, and to obtain a catalyst suitable for tertiary olefins, multistage countercurrent contacting is preferred.

Although not a great deal of inerts remains dissolved in the liquor product from the absorber, if desired, the inerts can be removed, for example, by reducing the pressure on the liquid product and venting the evolved gases.

Only a fraction of the total olefin used in the overall process need be charged to the sulfuric acid catalyst absorber with production of a high yield of dialkyl sulfate to restore the activity of the catalyst. When it is desired to process more olefin feed through the absorber than the available acid will convert to dialkyl sulfate, for example in the separation of olefin from inerts, this can be done and the entire acid phase from this absorber charged directly to alkylation, as disclosed in my copending application, Ser. No. 642,739, filed June 1, 1967. In this case, enough olefin feed is charged to another sulfuric acid catalyst absorber for conversion of the olefins to dialkyl sulfate, followed by separation of the alkylation contaminants before charging the dialkyl sulfates to alkylation.

Certain economies can be effected and superior results obtained by carrying out the reaction of the olefin with sulfuric acid catalyst and the extraction of the resulting alkyl sulfates with a hydrocarbon simultaneously in the same vessel such as in a countercurrent tower. Non-catalytic alkylation conditions are maintained so that even though alkylation acid catalyst may be used for reaction with olefin in the presence of isobutane, the acid in contact with isobutane and olefin is below catalytic alkylation strength. If the operation is carried out efficiently so that the resulting spent acid will not react with any more secondary olefin, the resulting spent acid is effective for the selective conversion of teritary olefins.

EXTRACTION OF SECONDARY OLEFIN ABSORBER REACTION PRODUCT

Low temperatures and short residence times are preferred for the hydrocarbon extraction of the secondary olefin, e.g. n-butylene, absorber reaction product. For example, a temperature range of 30 to 50° F. with a few minutes residence time is satisfactory. However, good results have been obtained at ambient temperatures as high as 85 to 100° F. The conditions depend somewhat upon the absorption product and the olefin used for the absorption step.

The extraction step may be effected in equipment known in the art, for example, mixer-settlers, centrifugal contactors or countercurrent towers, for example, a rotating disc contactor. Less efficient extraction may be used to accomplish the same results if more water is present in the absorber reaction product.

The separation of the dialkyl sulfates from the acid-oil reaction product and water can be made in numerous ways, as disclosed in my U.S. Pat. No. 3,227,774 issued Jan. 4, 1966. For example, the absorber reaction mixture may be diluted with a large quantity of water, extracted with a hydrocarbon, such as isobutane, or a hydrocarbon solution may be chilled. I prefer to extract with isobutane.

Dialkyl sulfates are more readily extracted with a hydrocarbon than the alkyl acid sulfates. Thus, it is desirable to use conditions in the extraction step so as to extract not only the dialkyl sulfate, but also the alkyl acid sulfate and to approach as nearly as possible only acid-oil reaction product and water in the raffinate spent acid phase, with all of the alkyl sulfates in the extract of organic phase. Such conditions include the use of a liquid solvent dosage on the order of six mols per mol of alkyl sulfate, or higher, raffinate recycle, multi-stage countercurrent extraction, and optimum charge rate for a given extraction vessel. The raffinate or spent acid from the extraction step comprises water, alkyl acid sulfate, dialkyl sulfate, the reaction product of acid and polymeric oil formed during the alkylation and absorption steps, and usually some free sulfuric acid. The extract comprises the hydrocarbon solvent, dialkyl sulfate, and a minor amount of alkyl acid sulfate.

The weaker the raffinate acid is in the extraction step, the higher the relative solubility of the polymer oil is in hydrocarbon solvent, or the polymer oil is held less tightly by the acid. Polymeric oil contaminant in the absorber-extractor extract is highly unsaturated and it reacts readily with strong sulfuric acid, such as fresh make-up acid used for the alkylation step, or used alkylation acid catalyst, of about 90% concentration. The polymeric oil then can be removed from the absorber extract by acid treatment prior to charging it to alkylation, and optionally after removal of any excess unreacted olefin. Good results have been obtained by acid treating polymeric oil in isobutane solution with used alkylation acid of about 90% concentration at a temperature of 85° F. and a time as long as one hour. However, a temperature not over about 40 to 60° F. and a short time on the order of a few minutes or less are preferred. A very short time such as is obtained by mixing with a pressure drop orifice appears to be satisfactory. To insure substantially complete removal of the oil and also any water present, an excess of acid may be used. If too great an excess of acid is used, some dialkyl sulfate will dissolve in it and be lost from the extract. This is not too serious as the dialkyl sulfate may be reextracted with a hydrocarbon solvent from the separated acid phase. Or when operating in a continuous system, the acid phase may be charged to the main extraction tower. Alternatively to acid treating the extract, the entire absorber reaction product prior to extraction of the dialkyl sulfates may be acid treated to remove the polymeric oil.

ALKYLATION

In general the conditions for the alkylation step are those which are well known in the art. However, the bulk of the make-up acid is charged to alkylation as alkyl sulfates which result from the recovery section, and only a minor portion of the acid is charged as the fresh make-up acid of the usual 98 to 99.5% concentration. Since the alkyl sulfates are substantially water free, the trend is for the system catalyst, when using the acid recovery process, to be of lower water content and, in general, of superior quality in that a lower end point alkylate of higher octane value is obtained. Of course, if desired, less drying of charge stocks may be used, and in such a case the water content of the system catalyst may be as high as in conventional operation without acid recovery. The sulfuric acid in the alkylation system is usually maintained within a range of about 88 to 95% by purging spent acid from the system and adding fresh make-up acid. In a multiple reactor system, the acid of the lowest concentration is preferably purged and sent to the acid recovery system.

A large excess of isobutane is used in alkylation, for example, as much as 60 to 80 volume percent of the hydrocarbons in the alkylation reaction mixture. Consequently, a large quantity of isobutane must be recovered and recycled for reuse in the alkylation process. It is also available for the recovery process as described, and for the extraction or stripping of isobutylene.

In addition to the olefin which is charged to the alkylation step in the form of alkyl sulfates, additional fresh olefin is usually charged to the alkylation step. For example, when propylene is used for the absorption step, it is advantageous to use butylenes in the alkylation step.

PREPARATION OF THE CATALYST

Essentially, the catalyst can be made by reacting a secondary olefin such as propylene or n-butenes or a mixture thereof with strong sulfuric acid, extracting dialkyl sulfate formed and again reacting secondary olefin until no more will react. This also can be accomplished by operating countercurrently with an excess of olefin and with simultaneous absorption and extraction.

In one preparation of a catalyst from propylene, one gallon or 14 pounds of commercial used sulfuric acid alkylation catalyst having a titratable acidity of 91.0% of $H_2SO_4$ and containing 3.0% by weight of water and 1.9% by weight of polymeric hydrocarbon oil was continuously contacted in an agitated reactor at 30–35° F. with an excess of a propane-propylene feed, containing 55.5% propylene and 44.5% propane, until the diisopropyl sulfate content of the heavy acid phase and the propylene content of effluent hydrocarbon phase remained constant. This required 15 hours. The propane and unreacted propylene caused continuous extraction of diisopropyl sulfate. Approximately a quart or 3.3 pounds of heavy phase which may be referred to as a propylene raffinate conversion catalyst was obtained having the following analysis:

| | Wt. percent |
|---|---|
| Diisopropyl sulfate | 5.2 |
| Acid-polymeric oil complex | 11.6 |
| Water | 3.5 |
| Isopropyl acid sulfate | 79.7 |
| Total | 100.0 |
| Diisopropyl sulfate plus polymeric oil | 11.0 |
| Polymeric oil | 5.8 |

There was probably some free sulfuric acid present, and to the extent that it was present, the amount of isopropyl acid sulfate would be reduced by a corresponding amount. However, the principal characteristic of raffinate catalyst is that it is predominantly isopropyl acid sulfate containing some acid-polymeric oil complex, and will no longer react with propylene. The analysis can vary somewhat but for a given composition it should not react with additional propylene under the same conditions under which it is made.

Four different experiments were run with aliquots of the above propylene raffinate catalyst made from used sulfuric acid alkylation catalyst and propylene at 30–35° F. In each experiment raffinate catalyst was charged to a reactor and then the reactor was filled with the olefin feed stock. The agitation was turned on and the reaction continued for 30 minutes to one hour. In case there was a reaction resulting in a decrease in volume, additional olefin was charged. The temperature was controlled only roughly by packing the reactor in ice and maintaining a skin reactor temperature of 70–80° F. At the end of the run the agitation was shut off and the reactor contacts allowed to vaporize at ambient temperature and pressure. The liquid reaction mixture was then drawn off. When two phases were present, they were separated, and the hydrocarbon phase weathered to remove butanes and lighter.

EXAMPLE I—PROPYLENE

To 117.6 g. of a propylene raffinate catalyst prepared as described above was charged 256.1 g. of the propane-propylene feed at 70–80° F. Little if any reaction took place. No liquid product insoluble in the catalyst was obtained. The diisopropyl sulfate plus oil content of the catalyst phase remained unchanged at 11.0%. Only 108.8 g. of catalyst was recovered but the loss of 8.8 g. is thought to be largely a result of handling losses. A gain in weight is more significant than a loss in weight. Possibly some reaction would occur at a considerably higher temperature.

EXAMPLE II—ISOBUTYLENE

To 120.7 g. of the same propylene raffinate catalyst was charged 181.0 g. of isobutane-isobutylene feed.

The catalyst phase decreased in weight to 105.2 g. or by 12.9%. The diisopropyl sulfate plus polymeric oil increased from 11.0 to 14.0%. The polymeric oil decreased from 5.8 to 4.9%. The light weathered hydrocarbon phase recovered was 190.8 grams. An analysis showed it to be a mixture of equal parts of diisobutylene and triisobutylene with about 3% of higher molecular weight olefins. The hydrocarbon was completely olefinic with no saturates being present. Apparently substantially all of the isobutylene reacted to produce liquid polymers and alkyl sulfates.

Tests on the hydrocarbon phase for sulfate content by titration showed 0.1% alkyl acid sulfate and 3.1% dialkyl sulfate, calculated as $C_4$ alkyl groups. The sulfur content by X-ray analysis was 0.5%, corresponding to 3.3% diisopropyl sulfate, which agrees well with the titration data.

The results of this experiment show that the propylene raffinate catalyst is effective for the polymerization of isobutylene. All of the polymer and dissolved alkyl sulfates could be alkylated and the diisobutyene is a very good alkylation charge stock.

The alkyl sulfate content of the hydrocarbon phase coupled with the increase in dialkyl sulfate content of the catalyst phase and a decrease of 12.9% in the amount of catalyst phase show that the catalyst is effective for absorbing isobutylene to form butyl sulfates which can be extracted with a hydrocarbon, such as isobutane.

Thus, by contacting isobutylene feed stock with a spent acid or raffinate acid made from used alkylation acid and propylene the total amount of spent acid can be reduced and simultaneously isobutylene is remove from the feed stock.

EXPERIMENT III—n-BUTYLENES

To 119.9 g. of the propylene raffinate catalyst was charged 293.5 g. of isobutene-n-butylene feed (about ⅓ butane-1 and ⅔ butane-2).

No liquid product insoluble in the catalyst phase was obtained. Thus, in contrast to isobutylene, no polymer was formed. There was a modest increase in weight of the catalyst phase to 121.5 g., in addition to any handling losses. The dialkyl sulfate content increased from 5.2 to 18.6%. The polymeric oil content remained essentially constant at 5.4%.

The results of this experiment show that the propylene raffiinate catalyst although unreactive to propylene is effective for absorbing n-butylene to form alkyl sulfates. This means that when using n-butylenes or mixed propylene-n-butylenes, more sulfuric acid can be converted to dialkyl sulfates than when propylene alone is used.

This catalyst can be used to separate n-butylenes from propylene, which cannot be done with sulfuric acid. Thus it could be used in an analytical method to determine the amount of n-butylenes in a mixture of propylene and n-butylenes.

EXAMPLE IV—TERTIARY AMYLENES

To 120.9 g. of the raffinate catalyst was charged 198.8 g. of tertiary amylenes (a mixture of 2-ethylpropylene and 2-methyl-2-butylene).

A light hydrocarbon phase of 150.4 g. was recovered and after evaporation on a hot plate there remained 72.3 g. of liquid residue. Analysis of hte liquid residue indicated that it contained 25–50% of diisoamylene with most of the remainder being tertiary amylenes. About 5% was higher molecular weight olefins with no saturates present. There may have been more diisoamylene present originally than the analysis showed. The sulfate content by titration was 0.1% acid alkyl sulfate and 7.3 dialkyl sulfate, calculated as $C_5$ alkyl groups. The sulfur content by X-ray analysis was 1.4%, corresponding to 10.4% diisoamyl sulfate, which is somewhat higher than by the titration data. The catalyst phase recovered amounted to 116.6 g. The dialkyl sulfate content of this phase increased from 5.8 g. to 11.2%.

The results of this experiment indicate that under the conditions used the catalyst is not as effective in converting tertiary amylenes as isobutylene. However, in each case polymer as well as alkyl sulfates was formed.

There were no data or indications in any of the four experiments that conjunct polymerization occurred, which means that acid soluble oil resulting in a loss of olefin was not formed. The results indicate the catalyst to be quite selective, and it should be even more selective under better controlled conditions, for example, with isobutylene to give a higher yield of the dimer.

Obviously, many modifications and variations of the invention as hereinabove set forth, may be made without departing from the spirit and scope thereof, and therefore, only such limitations should be imposed as are indicated in the appended claims.

I claim:

1. A process for preparing a catalyst for conversion of tertiary olefins having from 3 to 5 carbon atoms to higher molecular weight compounds which comprises reacting sulfuric acid with an excess of a secondary olefin having from 3 to 5 carbon atoms and substantially free of tertiary olefin at a temperature in the range of 20°–50° F., until substantially no further reaction between said sulfuric acid and said secondary olefin occurs and removing dialkyl sulfates from said reaction product by extraction with an isoparaffin hydrocarbon solvent in liquid phase at a temperature in the range of about 30°–100° F. and a molal solvent dosage of at least about six to one, leaving as the raffinate acid said catalyst for conversion of tertiary olefins.

2. A process of claim 1 wherein said sulfuric acid is fresh concentrated acid of approximately 98–99.5 percent titratable acidity suitable for use as catalyst for the alkylation of isobutane with aliphatic olefins.

3. A process of claim 1 wherein said sulfuric acid is used sulfuric acid alkylation catalyst having a concentration in the range of from about 80% to 93% by weight and containing less than about 4% water by weight.

4. A process of claim 1 wherein said sulfuric acid has a titratable acidity of at least 78% $H_2SO_4$ and contains less than about 22% water by weight.

5. A catalyst for the conversion of tertiary olefins prepared in accordance with the process of claim 1.

References Cited

UNITED STATES PATENTS

| | | | |
|---|---|---|---|
| 1,790,520 | 1/1931 | Davis | 260—460 |
| 1,810,192 | 6/1931 | Taveau | 260—460 |
| 1,845,007 | 2/1932 | Taveau | 260—460 |
| 1,940,073 | 12/1933 | Brooks | 260—460 |
| 2,009,062 | 7/1935 | Lacy | 260—460 |
| 2,047,606 | 7/1936 | Young | 260—460 |
| 2,361,465 | 10/1944 | Filbert | 260—460X |
| 2,364,451 | 12/1944 | Kohler | 260—460 |

PATRICK P. GARVIN, Primary Examiner

U.S. Cl. X.R.

260—677, 683.62